UNITED STATES PATENT OFFICE.

ANGELIKA CZEPULL, OF LANCASTER, PENNSYLVANIA, ASSIGNOR OF ONE-THIRD TO PAUL HEINE, OF SAME PLACE.

BUILDING-BLOCK.

SPECIFICATION forming part of Letters Patent No. 675,374, dated June 4, 1901.

Application filed March 28, 1901. Serial No. 53,193. (No specimens.)

*To all whom it may concern:*

Be it known that I, ANGELIKA CZEPULL, a citizen of Germany, and a resident of Lancaster, Pennsylvania, have invented certain new and useful Improvements in Building-Blocks, of which the following is a specification.

This invention relates to a building-block which will effectively withstand the influence of air and water and which is of superior strength and tenacity.

My improved building-block is composed of the following ingredients: about forty parts, by weight, crushed furnace-slag; five parts, by weight, slaked lime; two parts, by weight, Portland cement; one part, by weight, gypsum, and one part, by weight, salt. The salt is dissolved in water, and the slaked lime, the cement, the slag, and the plaster-of-paris are successively added and thoroughly stirred in. After the mixture is completed the mass is molded into blocks of suitable size and is air-dried.

The sodium chlorid in the mixture acts upon the lime and upon the silicates of the slag and cement. Thus silicic acid is formed, which in turn acts upon a further quantity of the lime, forming calcium silicate. This calcium silicate hardens the mass rapidly in the presence of water, so that in this way a block of superior strength is produced.

What I claim is—

A building-block composed of slag, lime, cement, gypsum and salt, substantially as specified.

Signed by me at Lancaster city, Pennsylvania, this 22d day of March, 1901.

ANGELIKA CZEPULL.

Witnesses:
HARVEY B. LUTZ,
PAUL HEINE.